Patented Nov. 7, 1922.

1,434,593

UNITED STATES PATENT OFFICE.

DOMINIC J. CUTRONA, ROBERT B. McCANN, AND DON W. BISSELL, OF BUFFALO, NEW YORK, ASSIGNORS TO NATIONAL ANILINE AND CHEMICAL COMPANY, INC., OF NEW YORK, N. Y., A CORPORATION OF NEW YORK.

PURIFICATION OF PYROGALLOL.

No Drawing. Application filed January 7, 1921. Serial No. 435,722.

*To all whom it may concern:*

Be it known that we, DOMINIC J. CUTRONA, ROBERT B. McCANN, and DON W. BISSELL, citizens of the United States, residing at Buffalo, county of Erie, State of New York, have invented certain new and useful Improvements in the Purification of Pyrogallol; and we do hereby declare the following to be a full, clear, and exact description of the invention, such as will enable others skilled in the art to which it appertains to make and use the same.

This invention relates to the purification of pyrogallol from impurities such as metagallic acid, tarry compounds, etc.

In the preparation of pyrogallol from gallic acid, the crude product may contain a considerable amount of tarry and other impurities. It has been proposed to purify the crude pyrogallol by sublimation or vacuum distillation, but this is generally accompanied by losses. The present invention relates to an improved method of purification in which the losses are substantially avoided or reduced to a minimum.

The present invention is based upon the discovery that pyrogallol can be readily dissolved in boiling hydrocarbons, such as xylene, or solvent naphtha, while metagallic acid and the tarry compounds present in the crude product are substantially insoluble in such solvent, and upon the further discovery that the pyrogallol is insoluble or relatively so in the cold hydrocarbons. Accordingly, in carrying out the present process, we take advantage of these discoveries and subject the crude pyrogallol to the action of the hot hydrocarbon solvents in order to bring about solution of the pyrogallol without dissolving any appreciable amounts of the impurities, the impurities present in the crude product being practically insoluble in the hydrocarbons even at their boiling temperature. We then separate the hot solution of the pyrogallol from the insoluble impurities and cool the solution to bring about crystallization of the pyrogallol, which crystallizes out in a purified state and of a technical grade. The solubility of pyrogallol in such hydrocarbon solvents as xylene, solvent naphtha, kerosene, etc., at their boiling temperatures, is such that these solvents are available for the practical carrying out of the process on a commercial scale. The amount of tarry impurities that the solvents take up is so small that they can be used repeatedly for treating new batches of crude material.

The extraction of the pyrogallol with the hot solvent can be effected in a single operation or in successive or progressive extractions, or in a continuous or counter-current manner. Separate or successive charges of the crude pyrogallol can thus be purified by treatment with separate or successive amounts of the boiling solvent, or the extraction can be carried out in a continuous manner by causing the hot solvent to percolate through the crude material which may be admixed with an inert material to facilitate the extraction.

The crude pyrogallol may thus be heated with 10 times its weight of xylene or solvent naphtha (e. g., of about 140° C. b. p.) and boiled with a reflux condenser for about one hour, the resulting solution of the pyrogallol in the xylene being then separated from the tarry residue and allowed to cool, with resulting crystallization of the pyrogallol which is separated from the cooled solution by filtration. The xylene thus separated can be used for the treatment of a further batch of crude material. If the extraction of the pyrogallol is not completed in one operation, it may be treated with a further amount or amounts of the solvent in a similar manner.

Another method of practicing the invention is to mix the crude pyrogallol with about 3 times its weight of common salt, place the mixture in an extraction apparatus (similar in type to a Soxlet extraction apparatus) suitably heated, and to extract the pyrogallol with solvent naphtha by hot reflux extraction until the test shows that no further pyrogallol is being extracted. The hot solution is allowed to crystallize by cooling to ordinary temperature, the crystallized pyrogallol is filtered out, blown dry in a filter press, and then dried by heating to about 80° C. The solvent naphtha can then be used for a new extraction.

In carrying out the process last referred to, for example, about 65 parts by weight of the crude product can be pulverized and mixed with about 200 parts of dry salt, the mixture then placed in a hot extractor and extracted with 300 parts by weight of solvent naphtha or xylene until the extraction is completed, as indicated by cooling a test portion of the solvent to about 20° C., and noting that no further crystallization takes place. The hot solution of the pyrogallol thus obtained is then cooled to about 20° C. to crystallize the pyrogallol from the solution, and the crystallized pyrogallol is then filtered, blown as dry as possible in the filter press, and dried in an oven at about 80° C. The solvent can be used over again repeatedly without distillation.

The purified pyrogallol obtainable by the present process is of a crystalline structure, practically free from tarry material and from gallic and other carboxy-acids. The purified pyrogallol is sufficiently free from impurities to be of good technical grade. Its melting point has been found to be above 130° in most cases and the product is white or nearly white in color.

The improved method of the present invention gives a high yield of the pyrogallol and it can be carried out with but a very small solvent loss, inasmuch as the same solvent can be used repeatedly. The hydrocarbon solvents which we have found particularly advantageous and to be recommended are xylene and solvent naphtha, which should be practically anhydrous and distill around 130 to 145° with no entrained water. Kerosene can be used, but we regard its use as less advantageous and less to be recomended as we have found that xylene and solvent naphtha yield somewhat better results.

We claim:

1. The method of purifying pyrogallol, which comprises extracting the pyrogallol with a hot hydrocarbon solvent therefor, separating the hot solution from the insoluble material, and recovering the pyrogallol in a crystalline state from the resulting solution by cooling.

2. The method of purifying crude pyrogallol, which comprises treating the same with a boiling hydrocarbon solvent, separating the hot solution from the insoluble material, and allowing the solution to cool, whereby the pyrogallol crystallizes out in a purified condition.

3. The method of purifying crude pyrogallol, which comprises treating the same with boiling aromatic hydrocarbon solvent of boiling point about 130 to 145° C., separating the resulting solution from insoluble material, and cooling the resulting solution to bring about crystallization of the pyrogallol.

4. The process of purifying crude pyrogallol, which comprises treating the crude pyrogallol with boiling solvent naphtha, separating the resulting solution from the tarry impurities, and cooling the resulting solution to bring about crystallization of the pyrogallol.

5. The process of purifying crude pyrogallol, which comprises subjecting the crude pyrogallol to extraction with boiling solvent naphtha, separating the solution from the insoluble impurities, cooling the solution to bring about crystallization, separating the crystallized pyrogallol by mechanical means, and driving off the adhering solvent by drying to about 80° C.

6. The process of purifying crude pyrogallol, which comprises subjecting a body of the crude material to extraction with a hot hydrocarbon solvent, separating the resulting solution from insoluble impurities, cooling the solution to bring about crystallization of the pyrogallol therefrom, and using the same solvent repeatedly for the treatment of further amounts of crude pyrogallol.

7. The method of purifying crude pyrogallol, which comprises subjecting a body of crude material to extraction with a hot hydrocarbon solvent by percolating the solvent through the crude material, and allowing the resulting hot solution to cool to separate the pyrogallol therefrom by crystallization.

In testimony whereof we affix our signatures.

DOMINIC J. CUTRONA.
ROBERT B. McCANN.
DON W. BISSELL.